United States Patent
DeBruyne et al.

(10) Patent No.: US 8,819,342 B2
(45) Date of Patent: Aug. 26, 2014

(54) METHODS AND APPARATUS FOR MANAGING PAGE CROSSING INSTRUCTIONS WITH DIFFERENT CACHEABILITY

(71) Applicant: QUALCOMM Incorporated, San Diego, CA (US)

(72) Inventors: Leslie Mark DeBruyne, Cary, NC (US); James Norris Dieffenderfer, Apex, NC (US); Michael Scott Mcilvaine, Raleigh, NC (US); Brian Michael Stempel, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 13/626,916

(22) Filed: Sep. 26, 2012

(65) Prior Publication Data

US 2014/0089598 A1    Mar. 27, 2014

(51) Int. Cl.
*G06F 12/08* (2006.01)
*G06F 9/38* (2006.01)

(52) U.S. Cl.
CPC ........ *G06F 12/0886* (2013.01); *G06F 12/0888* (2013.01); *G06F 9/3816* (2013.01); *G06F 2212/452* (2013.01)
USPC .................... 711/125; 711/201; 711/E12.057

(58) Field of Classification Search
None
See application file for complete search history.

(56) References Cited

U.S. PATENT DOCUMENTS

| | | | |
|---|---|---|---|
| 7,330,959 B1 | 2/2008 | Anvin | |
| 7,337,272 B2 | 2/2008 | Morrow | |
| 7,404,042 B2 | 7/2008 | Stempel et al. | |
| 7,406,613 B2 | 7/2008 | Dieffenderfer et al. | |
| 8,117,404 B2 | 2/2012 | Yeh et al. | |
| 2004/0168043 A1 | 8/2004 | Keller et al. | |
| 2008/0189506 A1 | 8/2008 | Kopec et al. | |
| 2009/0119485 A1 | 5/2009 | Smith et al. | |
| 2009/0198909 A1 | 8/2009 | Speight et al. | |
| 2009/0313695 A1 | 12/2009 | Bridges et al. | |
| 2012/0036342 A1 | 2/2012 | King | |
| 2013/0304993 A1 | 11/2013 | Mark et al. | |

OTHER PUBLICATIONS

International Search Report and Written Opinion—PCT/US2013/061876—ISA/EPO—Dec. 20, 2013.

*Primary Examiner* — Kevin Verbrugge
(74) *Attorney, Agent, or Firm* — Peter Michael Kamarchik; Nicholas J. Pauley; Joseph Agusta

(57) ABSTRACT

An instruction in an instruction cache line having a first portion that is cacheable, a second portion that is from a page that is non-cacheable, and crosses a cache line is prevented from executing from the instruction cache. An attribute associated with the non-cacheable second portion is tracked separately from the attributes of the rest of the instructions in the cache line. If the page crossing instruction is reached for execution, the page crossing instruction and instructions following are flushed and a non-cacheable request is made to memory for at least the second portion. Once the second portion is received, the whole page crossing instruction is reconstructed from the first portion saved in the previous fetch group. The page crossing instruction or portion thereof is returned with the proper attribute for a non-cached fetched instruction and the reconstructed instruction can be executed without being cached.

21 Claims, 8 Drawing Sheets

METHODS AND APPARATUS FOR MANAGING PAGE CROSSING INSTRUCTIONS WITH DIFFERENT CACHEABILITY

CROSS REFERENCE TO RELATED APPLICATIONS

U.S. application Ser. No. 13/535,398 filed Jun. 28, 2012 entitled "Method and Apparatus for Tracking Extra Data Permissions in an Instruction Cache" is a related application and incorporated herein in its entirety.

FIELD OF THE INVENTION

The present invention relates generally to techniques to improve efficiency in a processor which processes instructions having a variety of lengths, and, more particularly, to advantageous techniques for identifying instructions that cross boundaries between cacheable and non-cacheable memory and allowing this entire instruction to be stored in a cache line with other cacheable instructions.

BACKGROUND OF THE INVENTION

A number of processors are designed to execute instructions of different lengths, such as 8-bit, 16-bit, 32-bit, and 64-bit instructions, for example. Programs for such a processor may contain a combination of these different length instructions chosen from a variable-length instruction set architecture. A processor may also have a hierarchical memory configuration with multi-levels of caches and may include an instruction cache, a data cache, and system memory, for example. The instruction cache may be configured to store and access a plurality of instructions together in cache lines. In a processor architecture supporting 16-bit and 32-bit instructions, 32-bit instructions may be stored unaligned in a cache line. Using 16-bit half-word addressing, a 32-bit instruction having its first 16-bit half-word stored in an odd 16-bit half-word address is considered not aligned. For example, a 256-bit cache line may store eight 32-bit instructions, or sixteen 16-bit instructions, or a combination of both 16-bit and 32-bit instructions. A cache line having a mix of 16-bit and 32-bit instructions may have the last 32-bit instruction crossing between two cache lines.

Also, a virtual memory system may be used that partitions the memory into pages, such as 4 kilobyte (4 k byte) pages. In such a system, the last 32-bit instruction in a cache line that crosses between two cache lines may also cross a page boundary. Each page may be assigned different attributes, which may include, for example, whether information stored on the page is cacheable or not cacheable. Thus, in a cache line having mixed instruction formats of different lengths, an instruction split across a cache line and across a page boundary may be subject to conflicting page attributes. For example, all instructions except the last instruction in the cache line may be from a first exemplary page having attributes that are cacheable, while the last instruction split across the cache line and the page boundary may have an attribute indicating a first part is cacheable while a second part is not cacheable. Such conflicts may be difficult to resolve without affecting the performance of the majority of instructions in the cache line identified with the boundary splitting last instruction.

SUMMARY OF THE DISCLOSURE

Among its several aspects, embodiments of the present invention recognize that performance can be improved by storing cacheable instructions in a cache line identified with a page boundary splitting last instruction. An embodiment of the invention recognizes that a need exists for a method to manage page crossing instructions with different cacheability. An indication is set for an ending portion of an instruction that was fetched from a first page of non-cacheable instructions and established with a beginning portion of the instruction that was fetched from a second page of cacheable instructions in a cache line having cacheable instructions, wherein the instruction crosses a cache line boundary. The indication is detected in a fetch pipeline when hitting on the established cache line to set a non-cacheable flag to indicate that the instruction cannot be executed from the instruction cache, wherein the instruction is received but not executed from the cache based on the non-cacheable flag. At least the ending portion of the instruction is refetched from memory bypassing the cache in response to the non-cacheable flag to combine with the beginning portion of the instruction, wherein the instruction is reconstructed for execution.

Another embodiment addresses an apparatus for controlling execution of page crossing instructions with different cacheability. An instruction cache is configured to store cacheable instructions and an instruction having a beginning portion that is cacheable and an ending portion that is non-cacheable and that crosses a cache line boundary at the end of a cache line. An indicator circuit is configured to store in one or more bits an indication that execution permission for the instruction is denied, wherein the instruction is identified as a non-cacheable instruction. A fetch pipeline is coupled to a processor and configured to detect the indication when hitting on a fetch group of instructions that contains the non-cacheable instruction, wherein the non-cacheable instruction is received but not executed from the cache in response to the indication.

Another embodiment addresses an apparatus for managing page crossing instructions with different cacheability. An instruction cache is configured to store cacheable instructions and an instruction having a beginning portion that is cacheable and an ending portion that is non-cacheable, that crosses a page boundary, and a cache line boundary at the end of a cache line. An indicator circuit is configured to store an indication that execution permission for the instruction is denied, wherein the instruction is identified as a non-cacheable instruction. A fetch pipeline is coupled to a processor and configured to detect the indication when hitting on a fetch group of instructions that contains the non-cacheable instruction, wherein the non-cacheable instruction is refetched from system memory for execution bypassing the cache in response to the indication.

Another embodiment addresses a computer readable non-transitory medium encoded with computer readable program data and code for operating a system. An indication is set for an ending portion of an instruction that was fetched from a first page of non-cacheable instructions and established with a beginning portion of the instruction that was fetched from a second page of cacheable instructions in a cache line having cacheable instructions, wherein the instruction crosses a cache line boundary. The indication is detected in a fetch pipeline when hitting on the established cache line to set a non-cacheable flag to indicate that the instruction cannot be executed from the instruction cache, wherein the instruction is received but not executed from the cache based on the non-cacheable flag. At least the ending portion of the instruction is refetched from memory bypassing the cache in response to the non-cacheable flag to combine with the beginning portion of the instruction, wherein the instruction is reconstructed for execution.

Another embodiment addresses an apparatus for managing page crossing instructions. Means is utilized for storing cacheable instructions and an instruction having a beginning portion that was fetched from a first page of cacheable instructions and an ending portion that was fetched from a second page of non-cacheable instructions and that crosses a cache line boundary at the end of a cache line. Means is provided for indicating that execution permission for the instruction is denied, wherein the instruction is identified as a non-cacheable instruction. Means is also provided for detecting the indication when hitting on a fetch group of instructions that contains the non-cacheable instruction, wherein the non-cacheable instruction is refetched from system memory for execution bypassing the cache in response to the indication.

A further embodiment addresses an apparatus for controlling execution of page crossing instructions with different cacheability. An instruction cache is configured to store cacheable instructions and an instruction having a beginning portion that is non-cacheable and an ending portion that is cacheable and that crosses a cache line boundary at the beginning of a cache line. An indicator circuit is configured to store in one or more bits an indication that execution permission for the instruction is denied, wherein the instruction is identified as a non-cacheable instruction. A fetch pipeline is coupled to a processor and configurable to detect the indication when hitting on a fetch group of instructions that contains the non-cacheable instruction, wherein the non-cacheable instruction is received but not executed from the cache in response to the indication.

A more complete understanding of the present invention, as well as further features and advantages of the invention, will be apparent from the following Detailed Description and the accompanying drawings.

DETAILED DESCRIPTION

The present invention will now be described more fully with reference to the accompanying drawings, in which several embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Computer program code or "program code" for being operated upon or for carrying out operations according to the teachings of the invention may be written in a high level programming language such as C, C++, JAVA®, Smalltalk, JavaScript®, Visual Basic®, TSQL, Perl, or in various other programming languages. Programs for the target processor architecture may also be written directly in the native assembler language. A native assembler program uses instruction mnemonic representations of machine level binary instructions. Program code or computer readable non-transitory medium as used herein refers to machine language code such as object code whose format is understandable by a processor.

Figure 1:
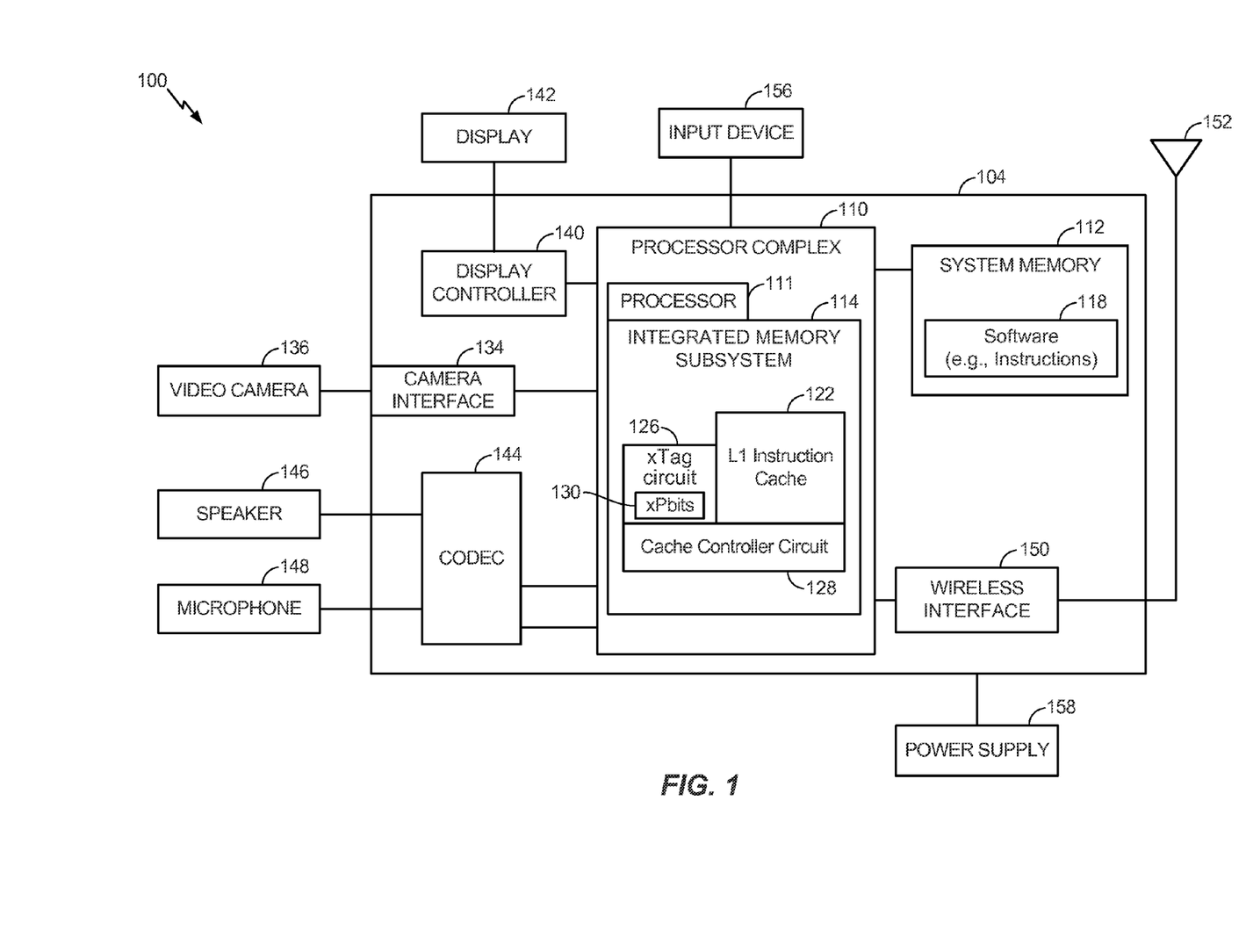
FIG. 1 is a block diagram of particular embodiment of a device including a processor complex having an instruction cache that supports instructions which cross cache line boundaries and paged memory boundaries.

FIG. 1 is a block diagram of particular embodiment of a device 100 (e.g., a communication device) including a processor complex 110 having an instruction cache that supports instructions which cross cache line boundaries and paged memory boundaries. The device 100 may be a wireless electronic device and include the processor complex 110 coupled to a system memory 112 having computer executable instructions 118. The system memory 112 may include the system memory 227 of FIG. 2 or the system memory 452 of FIG. 4B. The processor complex 110 may include a processor 111 and an integrated memory subsystem 114 having a level 1 instruction cache (L1 Icache) 122, an external tag (xTag) circuit 126, and a cache controller circuit 128. The integrated memory subsystem 114 supports a paged memory organization having one or more pages in program memory that may be specified and identified as non-cacheable. The processor 111 may include the processor 210 of FIG. 2 or the processor pipeline 442 of FIG. 4B. The integrated memory subsystem 114 may also include a L1 data cache and a level 2 unified cache (not shown), such as the L1 data cache 214 and the L2 instruction and data cache 226 of FIG. 2 or the L2 cache 450 of FIG. 4B. The L1 Icache 122 may include the L1 Icache 218 of FIG. 2 or the L1 Icache 448 of FIG. 4B, as described in more detail below. The xTag circuit 126 may also include external permission bits (xPbits) 130 to provide an override indication that controls execution of an instruction, as described in more detail below with regard to the xTag circuit 447 and xPbits 449 of FIG. 4B.

The integrated memory subsystem 114 may be included in the processor complex 110 or may be implemented as one or more separate devices or circuitry (not shown) external to the processor complex 110. In an illustrative example, the processor complex 110 includes any of the circuits and systems of FIGS. 2, 3B, 4A, 4B, and 5, and operates in accordance with any of the embodiments illustrated in or associated with FIG. 3A and FIG. 6, or any combination thereof. For example, as shown in FIG. 1, the L1 Icache 122, the xTag circuit 126, and the cache controller circuit 128 are accessible within the processor complex 110, and the processor 1 is configured to access data or program instructions stored in the memories of the integrated memory subsystem 114 or in the system memory 112.

A camera interface 134 is coupled to the processor complex 110 and also coupled to a camera, such as a video camera 136. A display controller 140 is coupled to the processor complex 110 and to a display device 142. A coder/decoder (CODEC) 144 can also be coupled to the processor complex 110. A speaker 146 and a microphone 148 can be coupled to the CODEC 144. A wireless interface 150 can be coupled to the processor complex 110 and to a wireless antenna 152 such that wireless data received via the antenna 152 and wireless interface 150 can be provided to the processor 111.

Figure 3A:
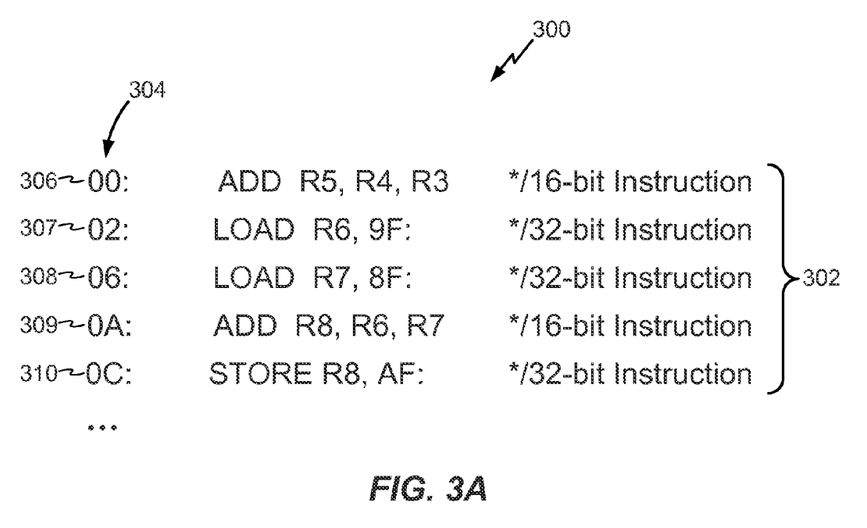
FIG. 3A illustrates an exemplary program segment containing varying length instructions of 16 and 32 bits.

The processor 111 may be configured to execute computer executable instructions 118 stored in a non-transitory computer-readable medium, such as the system memory 112, that are executable to cause a computer, such as the processor 111, to execute a program, such as the program segment 300 of FIG. 3A. The computer executable instructions 118 are further executable to cause the processor 111 to process instructions that access the memories of the integrated memory subsystem 114 and the system memory 112.

In a particular embodiment, the processor complex 110, the display controller 140, the system memory 112, the CODEC 144, the wireless interface 150, and the camera interface 134 are included in a system-in-package or system-on-chip device 104. In a particular embodiment, an input device 156 and a power supply 158 are coupled to the system-on-chip device 104. Moreover, in a particular embodiment, as illustrated in FIG. 1, the display device 142, the input device 156, the speaker 146, the microphone 148, the wireless antenna 152, the video camera 136, and the power supply 158 are external to the system-on-chip device 104. However, each of the display device 142, the input device 156, the speaker 146, the microphone 148, the wireless antenna 152, the video camera 136, and the power supply 158 can be coupled to a component of the system-on-chip device 104, such as an interface or a controller.

The device 100 in accordance with embodiments described herein may be incorporated in a variety of electronic devices, such as a set top box, an entertainment unit, a navigation device, a communications device, a personal digital assistant (PDA), a fixed location data unit, a mobile location data unit, a mobile phone, a cellular phone, a computer, a portable computer, tablets, a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or any combination thereof.

Figure 2:
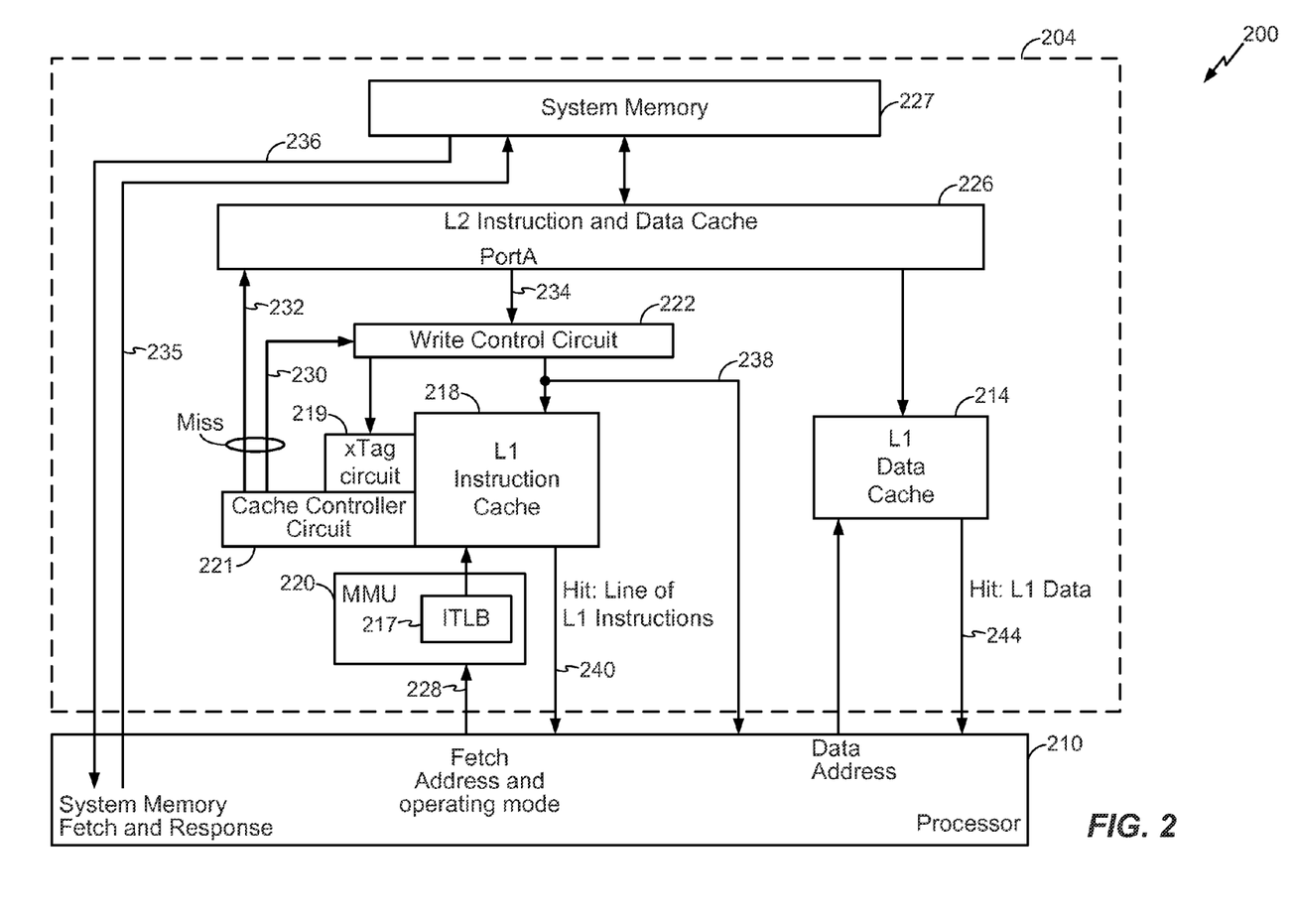
FIG. 2 illustrates a processor complex having a processor, a level 1 instruction cache (L1 Icache), an L1 data cache (Dcache), a level 2 cache (L2 cache). and a system memory in accordance with an embodiment of the invention.

FIG. 2 is an illustration of a processor complex 200 having a processor 210 which executes instructions of different lengths fetched from a memory hierarchy 204. The memory hierarchy 204 includes a level 1 (L1) data cache 214, a memory management unit (MMU) 220 comprising an instruction translation lookaside buffer (ITLB) 217, an L1 instruction cache (Icache) 218, an external tag (xTag) circuit 219, a cache controller circuit 221, a write control circuit 222, a level 2 instruction and data cache (L2 cache) 226, and system memory 227. The xTag circuit 219 is external to the Icache 218, which it is associated with, allowing functions of the xTag circuit 219 to be added to the processor complex 200 without modification of storage arrays in the Icache 218. The processor complex 200 may be suitably employed in hardware components of device 100 of FIG. 1 for executing program code. Peripheral devices which may connect to the processor complex are not shown for clarity of discussion of the present invention. The various components of the processing complex 200 may be implemented using application specific integrated circuit (ASIC) technology, field programmable gate array (FPGA) technology, or other programmable logic, discrete gate or transistor logic, or any other available technology suitable for an intended application.

The processor 210 retrieves instructions and data from the caches in a hierarchical fashion. For example, the processor 210 fetches an instruction by generating a fetch output 228 comprising a virtual fetch address and an operating mode. The operating mode may include an identification of a 32-bit instruction only mode, a 16-bit instruction only mode, a mixed 16-bit instruction and 32-bit instruction mode, other operating modes, and the like. Such a processor operating mode state indicator is controlled by a program in operation on the processor.

The processor's instruction set includes instructions encoded in multiple length formats, where longer instructions are conventionally a multiple of the shortest instruction format length available in the variable length instruction set. Since an instruction may have a complex encoding that may vary depending upon the length of the instruction and may be adjacent to instructions of different lengths, aligning and decoding of a fetched instruction may require more processing than a single processor pipeline stage with a short duration clock period may be able to provide. Due to the level of instruction complexity, the processor may include a separate instruction alignment pipeline stage and split the decode operation into a predecode operation and a decode pipeline stage. The predecode operation may be suitably hidden from normal pipeline execution by providing the predecode operation during L1 Icache miss processing. L1 Icache miss processing occurs when the fetched instruction is not found in the L1 Icache and must be fetched from higher levels of the memory hierarchy. The predecode operation stores predecode information along with the fetched instructions in the L1 instruction cache. Such predecode operations and operations of the xTag circuit 219 are controlled by the write control circuit 222.

In operation, the processor 210 generates a virtual address which is translated by the ITLB 217 to a physical fetch address that is used to access the L1 Icache 218 to determine if an addressed instruction is present in the L1 Icache by use of a match mechanism. If no match is found for the addressed instruction in the L1 Icache 218, a miss occurs. Miss information 230 is sent to the write control circuit 222 which may also include a predecoder, and the processor 210 makes an access request 232 to the L2 cache 226. With an instruction hit in the L2 cache 226, an L2 cache line containing the desired instruction is output on a first port (portA) 234 to the write control circuit 222. The write control circuit 222, during miss processing, partially decodes the instructions fetched from the L2 cache and provides instructions, predecoded bits associated with the instructions, and tag information such as execute permission bits on output 238 to the L1 Icache 218 with the instruction also passed to the processor 210.

When the processor 210 needs to fetch data, the processor 210 accesses L1 data cache 214 to determine if the addressed data is present If no match is found for the fetched data in the L1 data cache 214, a miss occurs and the L2 cache 226 is accessed next. In both L1 cache cases, if the instruction or data is found to be present in the L1 instruction or L1 data cache (referred to as hitting in the cache), then the instruction and data are read directly from their respective L1 cache on outputs 240 and 244. If a miss occurs for the L2 cache access, the instruction and data are provided by from the system memory 227.

FIG. 3A illustrates an exemplary program segment 300 that may suitably contain varying length instructions of 16 and 32 bits. The exemplary program segment 300 may suitably be stored in the memory hierarchy 204 of the processor complex 200. It should be noted that although for illustration purposes the program segment is assumed to be retrieved from one or more cache lines, the teachings of the invention are applicable to any memory device storing the program segment where an instruction may span a storage segment boundary. Since a cache line may have a fixed length, a program segment may span the boundary of a cache line and thus may have instructions which are split across the cache line boundary.

The program segment 300 includes instructions 302 which come from a variable length instruction set consisting of 16-bit and 32-bit instructions. For example, processor 210 may use 16-bit and 32-bit instruction formats for multiple types of instructions and may support several modes of operation that specify and restrict instruction type usage. For example, processor 210 may have a first mode of operation that specifies only 32-bit instructions may be used and a second mode of operation that specifies that a combination of 16-bit and 32-bit instructions may be used. While processors may have multiple modes of operation, for the purposes of clarity of discussion of the present invention, the description of the exemplary processor 210 is primarily limited to the second mode of operation described above.

In order to illustrate various embodiments, several exemplary 16-bit and 32-bit instructions are illustrated in FIG. 3A. For purposes of illustration, program relative byte indicators 304 represent the byte location in a cache line where an instruction begins and indirectly indicate the size of the instruction. For example, the ADD R5, R4, R3 instruction 306 begins at relative byte position 00 and ends at byte position 01. Thus, ADD R5, R4, R3 instruction 306 is a 16-bit instruction. Similarly, the ADD instruction 309 is also 16 bits long. The load (LOAD) instruction 307, the LOAD instruction 308, and the store (STORE) instruction 310 are 32-bits long.

A cache line size may vary in different processor implementations depending, for example, upon choices made in the design of the processor and memory hierarchy based on the fabrication technology used. The L2 cache 226 may use a 512-bit cache line and the L1 Icache 218 may use a smaller cache line, such as a 128-bit or a 256-bit cache line, for example. The indicated cache line size is exemplary and larger or smaller cache line sizes are not precluded. It is also noted that for illustrative purposes, the program segment 300 has been shown starting at the relative address 00. It will be appreciated, that such a program segment 300 may be located beginning at various points in a cache line and may span multiple cache lines.

Figure 3B:
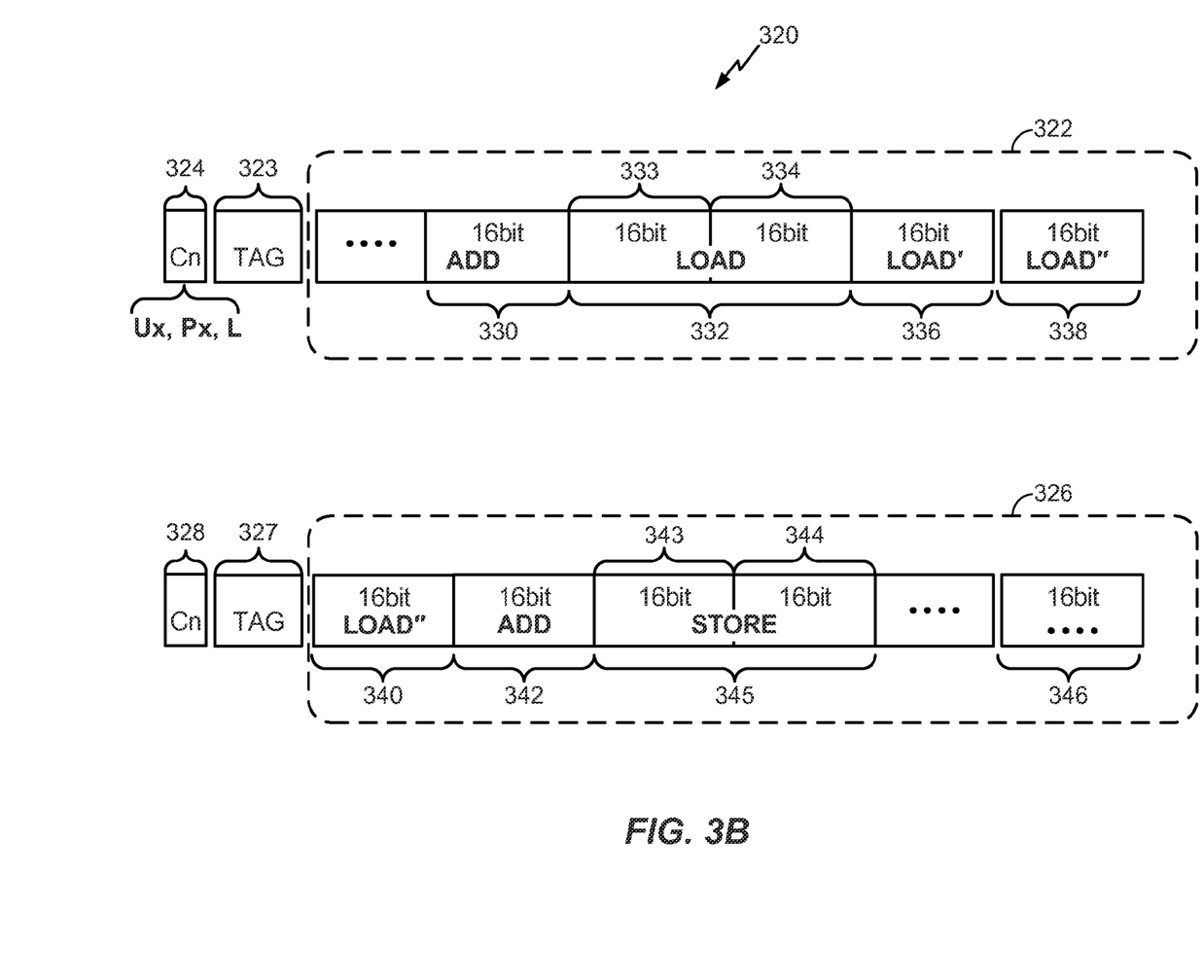
FIG. 3B illustrates exemplary L1 Icache lines containing instructions from the program segment 300 of FIG. 3A.

FIG. 3B illustrates exemplary L1 Icache lines 320 containing instructions from the program segment 300 of FIG. 3A. An exemplary first L1 Icache line 322 and an exemplary second L1 Icache line 326 are adjacent cache lines in the L1 Icache 218 of FIG. 2. The first L1 Icache line 322 comprises 16-bit fields 330, 333, 334, and 336 and a 16-bit extension field 338. The first L1 Icache line 322 is associated with a tag field 323 and control flags Cn 324 which may include a cacheable indicator (L) and execute permission bits, such as a user execute (Ux) bit and a privilege execute (Px) bit, for example. A non-asserted state of the Ux and Px bits may indicate do not execute in any mode. The second L1 Icache line 326 comprises 16-bit fields 340, 342, 343, and 344, and a 16-bit extension field 346. The second L1 Icache line 326 is associated with a tag field 327 and control flags Cn 328 which may include a cacheable indicator (L) and execute permission bits, such as a user execute (Ux) and a privilege execute (Px) bit associated with instructions stored in the second L1 Icache line 326.

The instructions of program segment 300 of FIG. 3A may be located in the first L1 Icache line 322 beginning with the 16-bit ADD R5, R4, R3 instruction 306 of FIG. 3A stored in the 16-bit field 330. The 32-bit LOAD instruction 307 is stored in a 32-bit field 332 comprising the two 16-bit fields 333 and 334. For illustrative purposes, the 16-bit field 333 contains the high order 16-bits of the LOAD instruction 307 and the adjacent 16-bit field 334 contains the low order 16-bits of the LOAD instruction 307.

The next instruction in the first L Icache line 322 is the 32-bit LOAD instruction 308 which is stored across two instruction cache lines. The high order 16-bits of the LOAD instruction 308 are stored in the 16-bit field 336 in the first L1 Icache line 322. The low order 16-bits of the LOAD instruction 308 are stored in the 16-bit field 340 in the second L1 Icache line 326. A copy of the low order 16-bits of the LOAD instruction 308 is stored in the 16-bit extension field 338. The ADD R8, R6, R7 instruction 309 and the STORE instruction 310, both of FIG. 3A, are stored in the 16-bit fields 342-344 in the second L1 Icache line 326 in similar fashion to segments 330 and 332 of the first L1 Icache line 322. It is also noted that predecode bits, not shown for clarity in the present description, may be associated with each 16-bit field in the cache line.

As shown in FIG. 3B, an instruction cache in a processor complex supporting 16-bit and 32-bit instructions, may be constructed having cache lines, that may store, for example, N K-bit format aligned instructions plus one K/2-format instruction. It is noted that FIG. 3B is exemplary, and K-bit instructions may be stored on 8-bit byte address boundaries and 16-bit half-word boundaries. Also, it is further noted that instruction set architectures having instruction formats which are not a multiple of each other, such as 16-bit and 24-bit instructions, are also supported by embodiments of the present invention.

With K=32-bits, for example, a cache line that stores eight 32-bit instructions on word aligned boundaries would be implemented in a cache having 256-bits+16-bits=272-bit lines associated with the instruction data. For a variable-length instruction processor, a cache line with a mix of 16-bit and 32-bit instruction may have a cache line crossing 32-bit instruction which would be stored in the last 32-bit location of a cache line making use of the extra K/2-bit space, such as the first cache line 322 with the 16-bit extension field 338. The low order 16-bit portion of the 32-bit cache line crossing instruction stored in the last 16-bits cache extension field 338 is a duplicate of the 16-bit portion stored in the next sequential cache line in bit field 340. In another example, a processor having instructions that are a multiple of 8-bits may also have line crossing instructions. For such instructions, the line crossing instruction may be split at a byte boundary with a one byte portion, a two byte portion, or a three byte portion of the instruction, for example, continuing on in the second cache line. The one byte portion, the two byte portion, or the three byte portion stored in the second cache line is copied and stored in a position associated with the first part of the line crossing instruction in the first cache line. In this exemplary case, a three byte extension to the cache line is provided. For example, the cache extension field 338 would be expanded to a three byte bit field instead of its presently illustrated 16-bits. Other byte length instructions are possible and not precluded by this invention. Since a cache line crossing instruction may also cross a page boundary into a non-cacheable page and thus may not be cacheable, the page boundary (line/page) crossing non-cacheable instruction must be prevented from executing from the cache. Also, the extension field 338 could be expanded to store more than a portion of a single instruction, such as storing a first portion of a single line crossing instruction and also storing a second instruction which would generally be associated with the next logical page stored with the cache line that is making use of the expanded extension field.

Figure 4A:
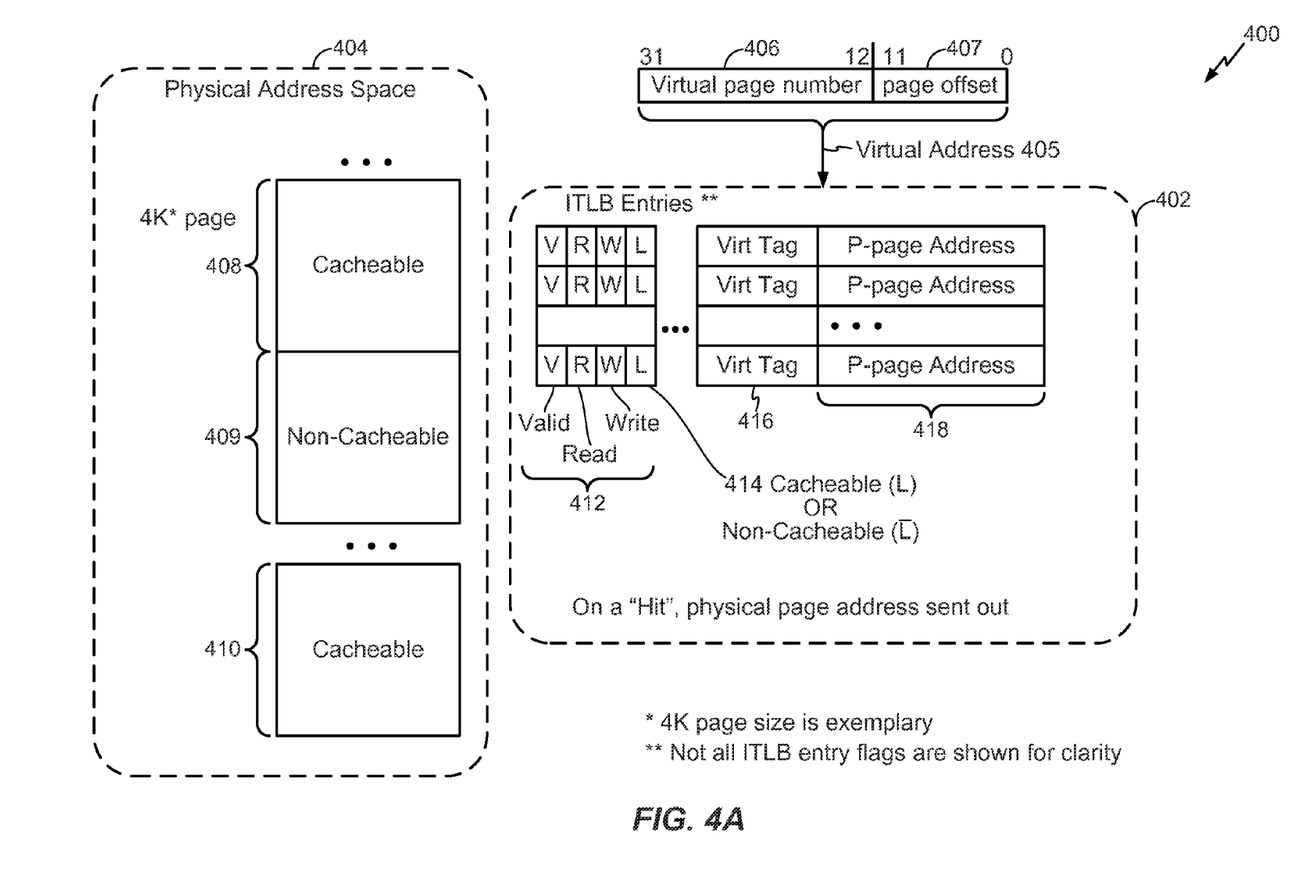
FIG. 4A illustrates a paged virtual memory system having an instruction translation look aside buffer (ITLB) and a physical memory in accordance with an embodiment of the invention.

FIG. 4A illustrates a paged virtual memory system 400 having an instruction translation look aside buffer (ITLB) 402 and a physical memory 404 in accordance with an embodiment of the invention. A virtual address 405 is generally encoded in two parts. An upper field of address bits usually represent a virtual page number 406 that is encoded based on a selected page size, such as 4 k byte pages. A lower field of address bits is a page offset 407 that identifies an address within the addressed page. In a virtual to physical address translation, the virtual page number is translated to a physical page number (P-page address). The page offset is the same for both the virtual address and the physical address and is not translated.

A virtual to physical address translation system may include one or more translation look aside buffers (TLBs) associated with the various caches, such as level 1 and level 2 instruction and data caches, to improve performance of the translation process. An instruction TLB (ITLB) is a small cache that stores recent virtual to physical address translations along with attributes of the stored pages, such as entry validation and whether the page contains cacheable or non-cacheable instructions. The ITLB conventionally includes a content addressable memory (CAM) circuit coupled with a random access memory (RAM) circuit and is relatively small, such as having 32 or 64 entries. Each ITLB entry includes a tag in the CAM circuit having a recently used virtual page number associated with a translated physical page number in the RAM circuit. For example, the paged virtual memory system 400 uses an ITLB 402 and a physical memory 404 having cacheable pages 408 and 410 intermixed with one or more non-cacheable page, such as non-cacheable page 409. Each entry of the ITLB 402 has flags 412 comprising a valid (V) flag, a read (R) flag, a write (W) flag, and a cacheable indicator (L) 414, a virtual address tag 416, and an associated physical page address 418. The L field 416 may be a single bit appropriate for identifying a page as cacheable or non-cacheable. Whether a page is cacheable or non-cacheable may be determined statically during compilation and might depend on a variety of factors. For instance, if memory mapped input and output (I/O) devices are used in an actual implementation of a system, such memory mapped locations may be tagged as non-cacheable.

Figure 4B:
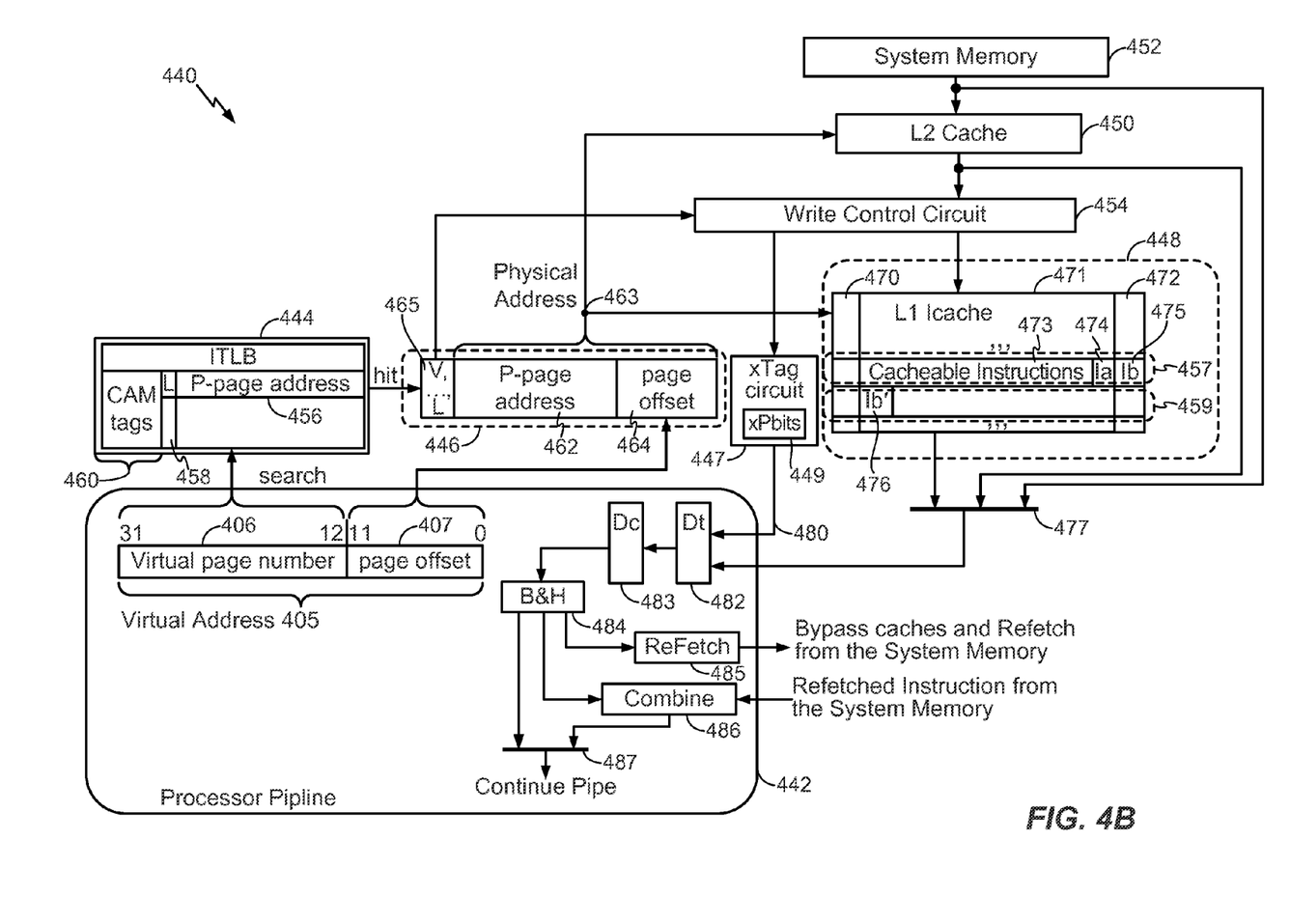
FIG. 4B illustrates a virtual to physical address translation subsystem having a line crossing indicator in the L1 Icache tags in accordance with an embodiment of the invention.

FIG. 4B illustrates a virtual to physical address translation subsystem 440 in accordance with an embodiment of the invention. The translation subsystem 440 is comprised of a processor pipeline 442, an ITLB 444, a physical address buffer 446, an xTag circuit 447, an L1 Icache 448, an L2 cache circuit 450, a system memory 452, and a write control circuit 454. The ITLB 444 has an entry 456 with a cacheable indicator (L) 458 in the ITLB tags. The L1 Icache 448 comprises a tag field 470 associated with each line, a base extent 471 for storage of cached instructions, and an extension field 472 associated with each line. Also, an exemplary first line 457 in the L1 Icache 448 comprises a set of cacheable instructions stored in a first base extent 473 of the first line 457. In the case of a 32-bit instruction that crosses a page boundary from a cacheable page of instructions, such as page 408 of FIG. 4A, to a page of instructions that are tagged as non-cacheable, such as page 409 of FIG. 4A, the non-cacheable portion of the instruction dictates that the 32-bit instruction be treated as a non-cacheable instruction. In this 32-bit instruction example, the first 16-bit portion (Ia) 474 is a cacheable portion having been fetched from a cacheable page, while the second 16-bit portion (Ib) 475 is a non-cacheable portion having been fetched from a non-cacheable page. The first portion Ia 474 is stored in the first base extent 473 of the first line 457 and the second portion Ib 475 is stored in an extension field associated with the first line 457. The first line 457 also has an associated tag selected from the tag field 470 comprising one or more execute permission bits associated with the cacheable instructions stored in the first base extent line 473. The L1 Icache 448 also includes an exemplary second line 459 comprising storage space for at least a second portion copy of Ib (Ib') 476. If the first portion Ia 474 and the second portion Ib 475 represented a cacheable instruction, the second portion copy Ib' 476 would be stored in the second line 459. In such a case with a cacheable line crossing instruction and depending on decisions made during an implementation, the second portion Ib 475 and the second portion copy Ib' 476 may switch positions since the contents of both portions is the same. However, in the exemplary case where the first portion Ia 474 and second portion Ib 475 are portions of a non-cacheable instruction, a second portion copy Ib' 476 is not stored in the second line 459. To address the exemplary scenario of a cache line having a non-cacheable instruction that is split across a line and page boundary, a non-cacheable indicator flag is associated with this instruction in the first line 457. The non-cacheable indicator flag is stored in the xTag circuit 447 external to the L1 Icache 448, as described in more detail below.

A translation process begins by applying a virtual page number 406 selected from a virtual address 405 to a CAM circuit in the ITLB 444. The ITLB 444 does a parallel comparison of the applied virtual page number 406 generally with all of the stored recently used virtual page numbers stored with the entry tags in the CAM tags 460. If there is a match, the CAM circuit accesses a corresponding entry 456 in a RAM circuit in the ITLB 444 which is output as a translated physical page address 462 and stored in the physical address buffer 446. A translated physical address 463 comprises the translated physical page address 462 concatenated with the page offset 464 from the virtual address 405.

For example, in an embedded system with a virtual address space of 4 gigabytes (4 GB) and 4 k byte pages, a virtual address 405 is comprised of a virtual page number 406 having bits [31:12] and a page offset 407 having bits [11:0]. In the same embedded system, the memory hierarchy of caches and main memory may encompass a physical memory space of 512 k bytes and 4 k byte pages. On a hit in the ITLB 444, the virtual address 405 is translated to a physical address 463. The physical address 463 is comprised of a physical page number 462 having bits [28:12], of which bits [18:12] are required for the 512 k byte implementation, and a page offset 464 having bits [11:0]. On a hit in the ITLB 444, tags including the cacheable indicator (L) 458 are also output and stored in the physical address buffer 446. The placement of the cacheable indicator (L) 458 and the tags 465 is exemplary. The physical address 463 is then applied to the L1 Icache 448. Before continuing with description of the translation subsystem 440, the problem of storing a non-cacheable instruction in the cache that is also a cache line and page crossing instruction is described next.

To address the problem of generally precluding storing in the cache a fetched cache line having cacheable instructions and a non-cacheable instruction which crosses the cache line due to determining the presence of the non-cacheable instruction, attributes associated with the extra K/2-bit field line crossing instruction data may be specified with a control attribute that is stored and tracked separately from the attributes of the rest of the instructions in the cache line. The control attribute in this exemplary case of having a non-cacheable instruction stored in a cache line that is also a cache line crossing instruction would be set to indicate do not execute the non-cacheable instruction in any mode. The control attribute would be stored in at least one storage bit that is associated with the cache line having the line/page crossing instruction. When the portion of the line/page crossing instruction is fetched from the cache as part of a fetch group, a non-cacheable flag would be asserted in the xTag circuit 447. An xTag circuit, such as the xTag circuit 447, is implemented for each cache line that may contain a page crossing instruction. Also, the xTag circuit 447 is accessed for flag data that is forwarded to the processor pipeline 442 which may generally occur only when that set of fetched cache line instructions contains a line crossing instruction. Also, it is noted that permission bits associated with the cacheable instructions in the fetch group are also retrieved. The line/page crossing instruction or portion thereof having the control attribute may override the permission bits associated with the fetch group just for the line/page crossing instruction in order to not allow the line/page crossing instruction to execute in any mode. Such operation may be controlled by the non-cacheable flag in the xTag circuit 447. The operation may also be controlled by providing xTag external permission bits (xPbits) 449 for just this line/page crossing instruction which are stored in the xTag circuit 447 and which overrides the cache line permission bits just for the line/page crossing instruction. The permission bits for the cacheable instructions accessed from the associated tag field 470, the line/page crossing instruction or portion thereof from the extension field 472, such as the second portion Ib 475, and the xPbits 449, for example accessed on xTag 480, for the line/page crossing instruction from the xTag circuit 447 are forwarded to the processor pipeline 442.

The processor pipeline 442 includes a detect (Dt) circuit 482, a first decode (Dc) circuit 483, a buffer and hold (B&H) circuit 484, a refetch circuit 485, a recombine circuit 486, and a multiplexer 487. The Dt circuit 482 detects that the second portion Ib 475 and the accessed xTag 480 have been received, generally in the pipeline stage that checks if execute permission is allowed and tags the second portion Ib 475 as do not execute. The Dc circuit 483 identifies whether the second portion Ib 475 is part of a page crossing instruction. It is noted that even though the second portion Ib 475 has been received in the stage where execute permission is checked, that by itself does not in general mean that the second portion Ib 475 is a page crossing instruction. Thus, the Dc circuit 483 decodes the data and determines, in this exemplary case, that the second portion Ib 475 is part of a page crossing instruction.

The processor pipeline 442 operation continues with the B&H circuit 484 which buffers instructions it has received from the cache line and determines whether the second portion Ib 475 represents the oldest instruction in the fetch group. If the B&H circuit 484 determines the second portion Ib 475 does not represent the oldest instruction in the fetch group, the B&H circuit 484 buffers the second portion Ib 475 and holds it until it has been determined to represent the oldest instruction. At the time it is determined that the second portion Ib 475 represents the oldest instruction in the processor pipeline 442, a flush of the processor pipeline above the second portion Ib 475 is executed. The non-cacheable instruction is refetched from system memory 452 which reuses an existing dataflow associated with resolving a permission fault problem. In this particular embodiment, the second portion Ib 475 may also be flushed or may be allowed to be overwritten.

In an alternative embodiment, the flush of the good cacheable data in the cache line may not be necessary and the refetch circuit 485 refetches the second portion Ib 475 that has the non-cacheable attribute, bypassing the instruction cache, and obtaining the second portion Ib 475 directly from system memory 452, through multiplexor 477, for example. The recombine circuit 486 combines the first portion Ia 474 with the second portion Ib 475 received from the system memory 452 to form a complete instruction, Ia||Ib, and passes the instruction through the multiplexer 487 to be decoded and continue pipeline processing allowing the combined instruction to execute without having been fetched from the instruction cache. It is noted that any necessary predecode and decoding operations on the combined instruction may need to be repeated following proper pipeline protocol for execution. It is also noted that the Dt circuit 482 may be associated with a fetch pipeline stage, the Dc circuit 483 associated with a general decode pipeline stage, and the B&H circuit 484 associated with an instruction queue. The exemplary circuitry 482-487 may be placed in appropriate pipeline stages according to a particular implementation.

Since instructions that precede the line/page crossing instruction may divert the flow of instructions away from the line/page crossing instruction, the processor pipeline stalls issuing the line/page crossing instruction and instructions following the line/page crossing instruction until a determination can be made whether the line/page crossing instruction has been reached. If the line/page crossing instruction is not reached, such as due to execution of a branch instruction, standard branch operations are followed. In one embodiment, if the line/page crossing instruction is reached, the line/page crossing instruction and instructions following the line/page crossing instruction are flushed and a non-cacheable request 235 is made to the system memory 227, bypassing the L1 Icache 218, for at least the line/page crossing instruction that was identified as non-cacheable. The non-cacheable instruction is returned on a system memory output bus 236 of FIG. 2, for example. Alternatively, in another embodiment, at least that portion of the line/page crossing instruction that was duplicated in the previous cache line is refetched, the whole line/page crossing instruction is reconstructed from the first portion saved in the previous fetch group. In both embodiments, the line/page crossing instruction or portion thereof is returned from system memory with the proper attribute for a non-cached fetched instruction and the reconstructed instruction can be executed without being cached.

In another embodiment, a fixed length instruction set architecture could have unaligned instructions due, for example, to use of a Von Neumann architecture with data of varying data widths stored with the fixed length instructions. The combination of fixed length instructions with data of mixed widths could lead to the same problem and solution for any unaligned instruction that crosses a cache line and also crosses a page boundary between a cacheable page and a non-cacheable page. Thus, processor performance for executing the majority of instructions in the cache line with the single line/page crossing instruction that is not cacheable remains the same as execution of instructions fetched from any cache line not having such a line/page crossing instruction. This result is achieved by allowing a line to be cached that might otherwise have been excluded from the cache because it partially contains non-cacheable data.

Returning to FIG. 4B, the execute permission bits are stored in a tag associated with each line in the L1 Icache 448 and are valid for each cacheable instruction stored in the base extent 471. The non-cacheable indicator flag may be stored in additional permission bits associated with the second portion Ib 475 that is stored in an extension field associated with the first line 457. The additional permission bits are stored external to the L1 Icache 448 in the xTag circuit 447, for example, and indicate do not execute for any reason. A cache line is chosen to have a fixed number of 16-bit instructions or a fixed number of 32-bit instructions. For example, with a cache line of 512-bits plus a 16-bit extension field, a 4 k byte page corresponds to 64 cache lines, which may be numbered 0 to 63. The 16-bit extension field may be stored in a separate array. Since only a line at set 63 may have a page crossing instruction, a fetch address is compared with the end of page address to determine whether to use the additional permission bits. The fetch address is also compared to determine if the addressed instruction is split across a cache line to identify it as a line crossing instruction.

The permission bits are generally written in a tag field associated with an accessed line. When an addressed cache line is not valid, as indicated, for example, by a valid flag in the Icache tags 470, the fetch is directed to the L2 cache 226 or to system memory 227. Generally, a fetch request speculatively returns a plurality of instructions for loading into the L1 Icache 218 and from which the requested instruction is returned to the processor 210. Associated with the fetch request is the cacheability attribute of the requested address, such as the L bit 414 of FIG. 4A. The L bit 414 is then generally associated with the fetch group and resolved with other flags into the permission bits that are loaded into the tag associated with the fetch group in the cache line. If the cacheability L bit 414 indicates the fetch group is not-cacheable, the fetch group is not loaded into the L1 Icache 448. However, for the case of a page crossing and line crossing instruction that is part of the fetch group, the first 16-bit portion of the instruction may be accessed from a cacheable page while the second 16-bit portion may accessed from a non-cacheable page. Since generally, two lines are fetched on a miss in a first level instruction cache, the cacheability of the second line may also be determined. Thus, the second 16-bit portion of the page and line crossing instruction may be loaded in the extension field associated with the rest of the cache line storing the fetch group and the extra permission bits (xPbits) 449 may be stored in the xTag circuit 447. It is noted, that in an alternative embodiment, the extension field may be expanded to store more than 16-bits accommodating, for example 32-bits or 48-bits, storing an additional 16-bit or 32-bit instruction. Also, if predecode bits are associated with each instruction in a cache line, the extension field might be expanded to include 2 or 4 predecode bits per 16-bit portion stored.

The extra data permission information may be identified from encodings of the pre-decode bits. In general, the extra data permission information may be stored in any storage field that can be associated with the page crossing instruction. In an implementation that uses predecode bits to identify an instruction as 32 bits or 16 bits, the page crossing instruction may also be identified in one or more extra predecode bits instead of identifying it based on a size and address calculation. Also, the indication to "not execute for any reason" may be stored in the predecode bits to identify the page crossing instruction as a faulty instruction for the case of non-cacheable data stored in the instruction cache.

Figure 5:
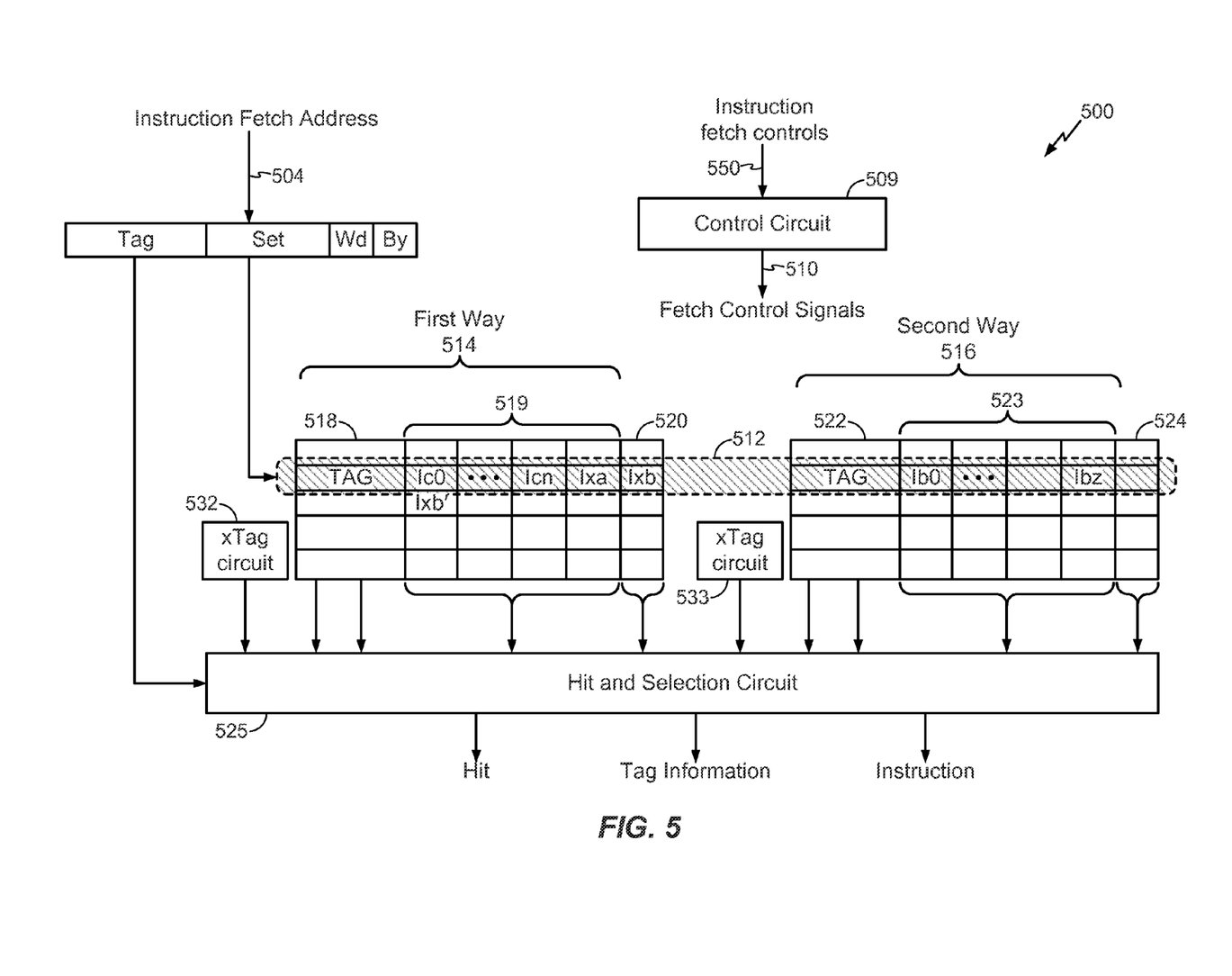
FIG. 5 illustrates an exemplary two way set associative Icache circuit having a line crossing instruction and a supporting line crossing indicator in accordance with an embodiment of the invention.

FIG. 5 illustrates an exemplary two way set associative Icache circuit 500 having a line crossing instruction and a supporting line crossing indicator in accordance with an embodiment of the invention. While the invention is applicable to other cache designs such as a direct mapped cache, a four way, an eight way, up to and including fully associative caches, a two way set associative instruction cache is shown as an exemplary instruction cache circuit 500. A first way 514 includes a first way tag bit field 518, including permission bits and a cache line address tag for each line in the first way. The first way 514 further includes lines of data 519 shown with "n" instructions, Ic0-Icn and a first portion Ixa, for example, and an extension field 520 shown as storing a second portion Ixb. The instruction cache circuit 500 also comprises storage for a second way 516 having a second way tag bit field 522, including permission bits and a cache line address tag for each line in the second way. The second way 516 further includes lines of data 523 shown with "z" instructions, Ib0-Ibz, and an extension field 524 shown as not occupied. In general, the storage capacity of the lines in each way would be the same though capable of storing a different number of instructions of different length. With the two-way Icache, there are two lines at set 63 for 4 k byte pages and each line may have a line and page crossing instruction, such as the instruction made up of Ixa and Ixb. Also, for each of these two lines, the extra permission bits are stored separately in the xTag circuits 532 and 533 and are tracked separately. In a four way set associative cache and with 4 k byte pages, there are four lines at set 63 with four xTag circuits. In a fully associative cache, every cache line could have a line and page crossing instruction and the extra permission bits could then be included in the tag bit fields 518 and 522 in order to track the page crossing instructions in each line in the cache.

The manner in which the instruction cache is actually implemented depends on the particular application and the design constraints imposed on the overall system. Those skilled in the art will recognize the interchangeability of various designs, and how best to implement the functionality described herein for each particular application. For example, while the extension fields 520 and 524 are shown directly associated with their corresponding line array, the extension fields 520 and 524 may be implemented in arrays separate from the line arrays.

Figure 6:
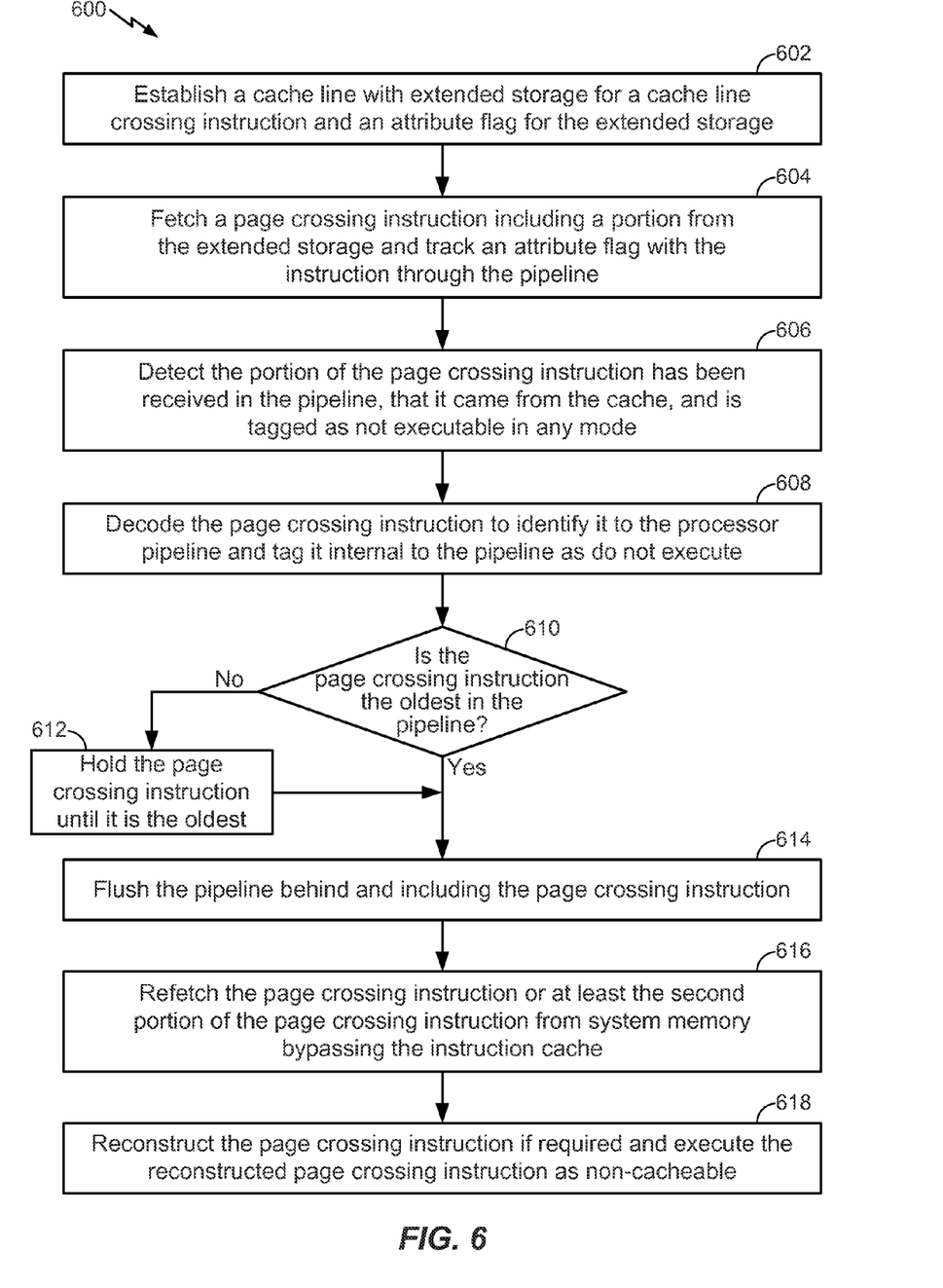
FIG. 6 illustrates a process for managing page crossing instructions with different cacheability in accordance with an embodiment of the invention.

FIG. 6 illustrates a process 600 for managing page crossing instructions with different cacheability in accordance with an embodiment of the invention. At block 602, a cache line is established with extended storage for a cache line crossing instruction and an attribute flag for the extended storage. The attribute flag may be stored external to the cache. At block 604, a page crossing instruction is fetched, for example in a fetch group of instructions, including a second portion of the page crossing instructions from the extended storage. Also, at block 604, the attribute flag is captured from an xTag circuit to track the attribute flag with the second portion of the page crossing instruction through the processor pipeline. At block 606, the second portion of the page crossing instruction is detected to have been received in the processor pipeline, that the page crossing instruction originated from the instruction cache, and that it is tagged as not executable in any mode. At block 608, the page crossing instruction is decoded to identify it to the processor pipeline and tag it internal to the processor pipeline as do not execute.

At decision block 610, a determination is made whether the page crossing instruction is the oldest instruction in the processor pipeline. If the page crossing instruction is not the oldest instruction in the processor pipeline, the process 600 proceeds to block 612. At block 612, the page crossing instruction is held until it is the oldest instruction in the processor pipeline, and then proceeds to block 614. Returning to decision block 610, if the page crossing instruction is the oldest instruction in the processor pipeline, the process 600 proceeds to block 614. At block 614, in an embodiment that makes use of an existing dataflow associated with resolving a permission fault problem, the processor pipeline is flushed behind and including the page crossing instruction. In an alternative embodiment, a flush is not executed and only the page crossing instruction or the second portion of the page crossing instruction that has the non-cacheable attribute is fetched directly from system memory. At block 616, the page crossing instruction is refetched or at least the second portion of the page crossing instruction is refetched from system memory bypassing the instruction cache. If the second portion is refetched, the first cacheable portion of the page crossing instruction is reserved for an operation to reconstruct the non-cacheable instruction. At block 618, the page crossing instruction is reconstructed if required by combining the cacheable first portion with the second portion that was refetched from system memory and executed as non-cacheable.

The present invention is not limited to the illustrated instruction flow logic 200 and is further applicable to any pipeline processor having variable length instructions which may also store predecode information in an instruction cache. Extensions to a variable length processor instruction set may be accommodated by the present invention if the extension supports a unique mode of instruction set use. For example, a mode of operation may be specified where 16-bit, 32-bit, and 64-bit instructions are operative, such that 32-bit and 64-bit instructions may span across two L1 Icache lines. The processor using 64-bit instruction types may be an extension of the exemplary processor 204 described above. The extended processor could have operating mode states encoded for example for a first state restricted to only 32-bit instructions, a second state for both 16-bit and 32-bit instructions, a third state for 16-bit, 32-bit, and 64-bit instructions, and a fourth state restricted to only 64-bit instructions. A 64-bit instruction in an Icache line could be partitioned into four 16-bit fields. An extension bit field may be used having 48-bits to allow a 64-bit instruction to be split across four 16-bit portions in a line and page crossing situation.

The present invention is also not limited to instruction lengths that are power of two. For example, consider an alternative architecture that has 16-bit and 24-bit instructions. In this example, an instruction cache line may be partitioned into 8-bit instruction sections. A 24-bit instruction could consist of three 8-bits sections, for example. A 192-bit base extent cache line storing 16-bit instructions would be able to hold twelve 16-bit instructions and eight 24-bit instructions. A 16-bit extension field would allow the 24-bit instructions to be split into three 8-bit portions. A cache line for this exemplary cache would be 192+16=208-bits.

An embodiment also addresses an alternative cache that may be configured with an extension data storage portion, such as the extension field 472 of FIG. 4B, structured at the beginning of the cache lines. With an extension field at the beginning of the cache lines, an embodiment addresses a first instruction having a first half that is non-cacheable and a second half that is cacheable and the rest of the cache line having data that is cacheable. The procedures for handling the non-cacheable portion of the first instruction in this alternative cache operate in a manner similar to the procedures for handling the non-cacheable portion of the last instruction for the cache shown in FIG. 4B, as described herein. Fetches for the cacheable second instruction to the last instruction in an alternative cache line would operate in a similar manner as fetches for the cacheable first instruction to the N−1 instruction in the cache shown in FIG. 4B.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The methods described in connection with the embodiments disclosed herein may be embodied in hardware and used by software from a memory module that stores non-transitory signals executed by a processor. The software may support execution of the hardware as described herein or may be used to emulate the methods and apparatus for managing page crossing instructions with different cacheability. The software module may reside in random access memory (RAM), flash memory, read only memory (ROM), electrically programmable read only memory (EPROM), hard disk, a removable disk, tape, compact disk read only memory (CD-ROM), or any other form of non-transient storage medium known in the art. A storage medium may be coupled to the processor such that the processor can read information from, and in some cases write information to, the storage medium. The storage medium coupling to the processor may be a direct coupling integral to a circuit implementation or may utilize one or more interfaces, supporting direct accesses or data streaming using down loading techniques.

While the present invention has been disclosed in a presently preferred context, it will be recognized that the present teachings may be adapted to a variety of contexts consistent with this disclosure and the claims that follow.

We claim:

1. A method for managing page crossing instructions with different cacheability, the method comprising:

setting an indication for an ending portion of an instruction that was fetched from a first page of non-cacheable instructions and established with a beginning portion of the instruction that was fetched from a second page of cacheable instructions in a cache line having cacheable instructions, wherein the instruction crosses a cache line boundary;

detecting the indication in a fetch pipeline when hitting on the established cache line to set a non-cacheable flag to indicate that the instruction cannot be executed from the instruction cache, wherein the instruction is received but not executed from the cache based on the non-cacheable flag; and refetching at least the ending portion of the instruction from memory bypassing the cache in response to the non-cacheable flag to combine with the beginning portion of the instruction, wherein the instruction is reconstructed for execution.

2. The method of claim 1, wherein the instruction is fetched across a page boundary between a page having non-cacheable instructions and a page having cacheable instructions.

3. The method of claim 1, wherein the cache line stores instructions on aligned boundaries within the cache line having a capacity of N K-bits plus at least (K/2)-bits in each cache line.

4. The method of claim 1, wherein the cacheable instructions are a set of instructions having K-bit instructions and K/2-bit instructions selected from a variable-length instruction set architecture.

5. The method of claim 1, wherein the indication is stored in one or more bits to indicate execution permission for the instruction is denied.

6. The method of claim 1 further comprising:

fetching the instruction in a fetch group from the cache;

stalling the fetch pipeline upon detecting the non-cacheable flag; and flushing the fetch pipeline upon determining the processor has reached the instruction for the purpose of execution.

7. An apparatus for controlling execution of page crossing instructions with different cacheability, the apparatus comprising:
- an instruction cache configurable to store cacheable instructions and an instruction having a beginning portion that is cacheable and an ending portion that is non-cacheable and that crosses a cache line boundary at the end of a cache line;
- an indicator circuit configurable to store in one or more bits an indication that execution permission for the instruction is denied, wherein the instruction is identified as a non-cacheable instruction; and
- a fetch pipeline coupled to a processor and configurable to detect the indication when hitting on a fetch group of instructions that contains the non-cacheable instruction, wherein the non-cacheable instruction is received but not executed from the cache in response to the indication.

8. The apparatus of claim 7, wherein the fetch pipeline is operable to refetch at least the ending portion of the non-cacheable instruction from memory bypassing the cache in response to the detected indication to combine with the beginning portion of the non-cacheable instruction and reconstruct the non-cacheable instruction for execution.

9. The apparatus of claim 7, wherein the cache line stores K-bit and K/2-bit wide instructions on aligned boundaries within each cache line that is N*K-bits plus K/2-bits wide and the K/2-bit portion of the cache line stores a K/2-bit ending portion of a line crossing instruction.

10. The apparatus of claim 7, wherein the ending portion is a duplicate of an ending portion established in a next cache line.

11. An apparatus for managing page crossing instructions with different cacheability, the apparatus comprising:
- an instruction cache configurable to store cacheable instructions and an instruction having a beginning portion that is cacheable and an ending portion that is non-cacheable and that crosses a page boundary and a cache line boundary at the end of a cache line:
- an indicator circuit configurable to store an indication that execution permission for the instruction is denied, wherein the instruction is identified as a non-cacheable instruction; and
- a fetch pipeline coupled to a processor and configurable to detect the indication when hitting on a fetch group of instructions that contains the non-cacheable instruction, wherein the non-cacheable instruction is refetched from system memory for execution bypassing the cache in response to the indication.

12. The apparatus of claim 11, wherein the indicator circuit is external to the instruction cache.

13. The apparatus of claim 11 further comprising:
- a cache way indicator circuit for each cache way configurable to store a way indication that execution permission for the non-cacheable and line crossing instruction stored in an associated way is denied.

14. The apparatus of claim 11, wherein a processor pipeline comprises:
- a detect circuit configurable to detect the ending portion of the non-cachcable instruction and the indication has been received in the processor pipeline;
- a decode circuit configurable to identify the non-cacheable instruction to the processor pipeline; and
- a buffer and hold circuit configurable to buffer instructions received from the instruction cache and to determine whether the non-cacheable instruction is the oldest instruction available for execution in the processor pipeline.

15. The apparatus of claim 14, wherein the non-cacheable instruction is determined to be the oldest instruction available for execution and the processor pipeline is flushed behind and including the non-cacheable instruction.

16. The apparatus of claim 14, wherein a branch instruction received before the non-cacheable instruction causes the processor to branch away from the non-cacheable instruction and the non-cacheable instruction is overwritten in the buffer and hold circuit.

17. The apparatus of claim 11, wherein a processor pipeline comprises:
- a refetch circuit configurable to refetch the ending portion of the non-cacheable instruction from system memory bypassing the instruction cache.

18. The apparatus of claim 17, wherein the processor pipeline comprises:
- a recombine circuit configurable to combine the beginning portion of the non-cacheable instruction with the refetched ending portion received from the system memory to form a complete instruction to be executed.

19. A computer readable non-transitory medium encoded with computer readable program data and code, the program data and code when executed operable to:
- set an indication for an ending portion of an instruction that was fetched from a first page of non-cacheable instructions and established with a beginning portion of the instruction that was fetched from a second page of cacheable instructions in a cache line having cacheable instructions, wherein the instruction crosses a cache line boundary;
- detect the indication in a fetch pipeline when hitting on the established cache line to set a non-cacheable flag to indicate that the instruction cannot be executed from the instruction cache, wherein the instruction is received but not executed from the cache based on the non-cacheable flag; and
- refetch at least the ending portion of the instruction from memory bypassing the cache in response to the non-cacheable flag to combine with the beginning portion of the instruction, wherein the instruction is reconstructed for execution.

20. An apparatus comprising:
- means for storing cacheable instructions and an instruction having a beginning portion that was fetched from a first page of cacheable instructions and an ending portion that was fetched from a second page of non-cacheable instructions and that crosses a cache line boundary at the end of a cache line;
- means for indicating that execution permission for the instruction is denied, wherein the instruction is identified as a non-cacheable instruction; and
- means for detecting the indication when hitting on a fetch group of instructions that contains the non-cacheable instruction, wherein the non-cacheable instruction is refetched from system memory for execution bypassing the cache in response to the indication.

21. An apparatus for controlling execution of page crossing instructions with different cacheability, the apparatus comprising:
- an instruction cache configurable to store cacheable instructions and an instruction having a beginning portion that is non-cacheable and an ending portion that is cacheable and that crosses a cache line boundary at the beginning of a cache line;

an indicator circuit configurable to store in one or more bits an indication that execution permission for the instruction is denied, wherein the instruction is identified as a non-cacheable instruction; and a fetch pipeline coupled to a processor and configurable to detect the indication when hitting on a fetch group of instructions that contains the non-cacheable instruction, wherein the non-cacheable instruction is received but not executed from the cache in response to the indication.

* * * * *